United States Patent [19]

Inuiya et al.

[11] Patent Number: 4,908,709
[45] Date of Patent: Mar. 13, 1990

[54] SOLID-STATE ELECTRONIC IMAGING DEVICE WITH A PHOTOMETRY FUNCTION RESPONSIVE TO DISCARDED CHARGE PACKETS

[75] Inventors: Masafumi Inuiya; Yukio Hagino; Jun Inada, all of Tokyo, Japan

[73] Assignee: Fuji Photo Film Co., Ltd., Kanagawa, Japan

[21] Appl. No.: 281,779

[22] Filed: Dec. 9, 1988

[30] Foreign Application Priority Data

Dec. 11, 1987 [JP] Japan .............................. 62-312151
Jan. 13, 1988 [JP] Japan .................................. 63-3881

[51] Int. Cl.$^4$ ............................................. H04N 3/14
[52] U.S. Cl. ............................ 358/213.19; 358/213.26
[58] Field of Search .................... 358/213.19, 213.26, 358/909, 213.29, 213.24

[56] References Cited

U.S. PATENT DOCUMENTS

| | | | |
|---|---|---|---|
| 3,931,463 | 1/1976 | Levine ............................ | 358/213.19 |
| 4,516,172 | 5/1985 | Miyata et al. .................... | 358/213.24 |
| 4,573,078 | 2/1986 | Rentsch et al. .................. | 358/213.26 |
| 4,577,115 | 3/1986 | Rentsch et al. .................. | 358/213.26 |
| 4,651,215 | 3/1987 | Bell et al. ......................... | 358/213.26 |
| 4,783,702 | 11/1988 | Sone et al. ........................ | 358/213.19 |
| 4,835,616 | 5/1989 | Morcom ............................ | 358/213.19 |

Primary Examiner—Jin F. Ng
Assistant Examiner—Stephen Brinich
Attorney, Agent, or Firm—Birch, Stewart, Kolasch & Birch

[57] ABSTRACT

In an imaging device having an electronic shutter, a shooting operation is achieved by the use of a CCD sensor, and a pre-shooting operation is conducted which accumulates signal electric charge such that the signal electric charge is discharged through a reverse transfer. In response to the amount of the signal electric charge thus discharged, the amount of exposure is determined (namely, the shutter speed and the iris value). By measuring the amount of the signal electric charge thus discharged for each predetermined range of a light receiving area, a multi-light measurement is achieved. The light receiving area has a plurality of photoelectric converter elements of the MOS capacitor type disposed therein and is subdivided into a plurality of areas which are insulated from each other. The pre-shooting operation is conducted which accumulates signal electric charge in the photoelectric converter elements such that the signal electric charge is discharged to the side of the substrate for each subdivided area. In response to the amount of the signal electric charge thus discharged, the amount of exposure is determined (namely, the shutter speed and the iris value). By measuring the amount of the signal electric charge thus discharged for each subdivided area, the multi-light measurement is achieved.

6 Claims, 6 Drawing Sheets

SOLID-STATE ELECTRONIC IMAGING DEVICE WITH A PHOTOMETRY FUNCTION RESPONSIVE TO DISCARDED CHARGE PACKETS

BACKGROUND OF THE INVENTION

The present invention relates to a solid-state electronic imaging device with a so-called electronic shutter employed, for example, in apparatuses such as an electronic still camera (a still video camera) and a video camera.

Generally, in order to obtain an image of an object with an appropriate exposure or an image exposed with an appropriate amount of light, it is indispensable to adjust a shutter speed and a diaphragm or an iris. For the adjustment operations above, information attained from a light measurement is required. According to the conventional method, such measurement information is directly obtained by using a serial video signal produced from an imaging device, or by a light measuring element which includes one photodiode or several photodiodes that are disposed to develop an output signal therefrom as measurement information. In the former method, since the video signals are delivered in a serial fashion, it is difficult to extract only the desired information necessary for the control and adjustment of the object processing. Furthermore, at least a period of 1/60 second is necessary to read out a field of video signals. In the latter method, a problem results from measurement information being obtained only in a fixed location of an object scene or information being obtained about an average of the incident light only in a fixed location. When measuring the amount of incident light in each of a plurality of locations in an object scene, namely, for a so-called multi-light measurement, there has been recently developed a light measuring element. However, this light measuring element is expensive and the location of a pattern to be subjected to the light measurement (the partition pattern of the light receiving area) is limited.

SUMMARY OF THE INVENTION

It is therefore an object of the present invention to provide a solid-state electronic imaging device which is capable of measuring lights without necessarily requiring a light measuring element and of effecting the multi-light measurement in which the light measurement is completed in a relatively short period of time.

The solid-state electronic imaging device according to an embodiment to the present invention is characterized in that the device includes a plurality of photoelectric converter elements disposed in vertical and horizontal directions for storing therein a signal electric charge associated with the amount of an incident light, vertical transfer sections disposed in a vertical direction adjacent to each vertical column of the photoelectric converter elements for transferring the signal electric charge in a direction of the output terminals in response to a transfer signal and for transferring the signal electric charge in a reverse direction of discharge output terminals disposed on a side opposite to the output terminals in response to a reverse transfer signal, transfer gates for transferring the signal electric charge accumulated in the photoelectric converter elements to the vertical transfer section adjacent thereto in response to a gate signal, a measuring circuit connected to the discharge terminals of the vertical transfer sections for measuring the amount of an incident light based on the amount of the signal electric charge reversely transferred, and a horizontal transfer section connected to the output terminals of each of the vertical transfer sections for sequentially transferring the signal electric charge transferred in a forward direction, thereby outputting a video signal.

According to an embodiment of the present invention, there is utilized a reverse transfer of electric charges effected in a solid-state electronic imaging device having a so-called electronic shutter. In the solid-state electronic imaging device according to the present embodiment the light measurement is effected by use of a pre-shooting operation. Signal electric charges accumulated through the pre-shooting operation are discharged by a reverse transfer so as to measure an amount of signal electric charge thus discharged. Based on the measured value, the shutter speed and the value of the iris or the diaphragm are determined.

The light measurement is achieved by means of a solid-state electronic imaging element for shooting an object image and accomplishing the light measurement with a satisfactory accuracy so as to effect an appropriate adjustment of the exposure. In addition, since the signal electric charge accumulated in the pre-shooting is collected through the reverse transfer, the light measurement can be carried out at a high speed.

According to the present embodiment, since the light measurement is achieved by use of a solid-state imaging device for shooting an object image, there need not necessarily be disposed a light receiving element, such as a photodiode, that is dedicated to the light measurement. The present embodiment, however, does not intend to prevent the disposition of the light receiving element dedicated to the light measurement. It is also possible to first roughly determine the exposure based on a light measuring signal from the light receiving element dedicated to the light measurement so as to thereafter decide an appropriate exposure according to the present embodiment.

When a plurality of light measuring circuits are disposed and the plurality of vertical transfer sections are classified into several groups such that discharged signal electric charges associated with the vertical transfer sections of the respective group is fed to the corresponding light measurement circuit, the amount of the incident light can be separately measured in each of the plurality of locations defined by partitioning the light receiving area in the horizontal direction. In addition, by sampling the discharged signal electric charge (preferably an integrated value for a fixed period of time) at a plurality of timing points, the amount of the incident light can be separately measured in each of the plurality of locations defined by partitioning the light receiving area in the vertical direction. In this manner, the amount of the incident light can be attained in each location by partitioning the light receiving area in the vertical and horizontal directions (namely, a multi-light measurement is effected), and hence the exposure control can be appropriately achieved in a desired location.

The configuration of the solid-state electronic imaging device according to the present embodiment includes a plurality of photoelectric converter elements of an MOS capacitor type arranged in a two-dimensional array on a light receiving area of a substrate, vertical transfer sections for transferring charge in a vertical direction signal electric charge subjected to a conversion in the photoelectric converter elements, and a horizontal transfer section for transferring signal electric charge in a horizontal direction inputted from the vertical transfer sections. When a clear signal is applied, the signal electric charge of the photoelectric conversion elements is discharged into the substrate. The device is characterized in that the light receiving area of the substrate is partitioned into a plurality of areas so as to insulate these areas with each other and a measuring circuit is disposed for measuring the amount of an incident light for each partitioned area based on the amount of the signal electric charge discharged therefrom.

According to the solid-state electronic imaging device of the present embodiment, when an electric potential applied to the photoelectric converter elements is lowered in order to clear the signal electric charge accumulated in the photoelectric converter elements of the MOS capacitor type, the signal electric charge is discharged into the side of the substrate. The light measurement effected by use of the solid-state electronic imaging device according to the present embodiment is carried out through a pre-shooting operation. Signal electric charge accumulated by the pre-shooting operation is discharged into the substrate side in response to a clear signal applied thereto so as to be measured, thereby determining the amount of the discharged signal electric charge. The shutter speed and the value of the iris are thereafter determined according to the measured value.

The light measurement is achieved by use of a solid-state electronic imaging device for shooting an object image with a satisfactory accuracy and the exposure can be appropriately adjusted. In addition, since the signal electric charge accumulated by the pre-shooting operation is discharged by lowering the voltage applied to the photoelectric converter elements of the MOS capacitor type, the light measurement can be effected at a high speed.

Since the light measurement is achieved by use of a solid-state electronic imaging device for shooting an object image, there need not necessarily be disposed a light receiving element such as a photodiode dedicated to the light measurement. The present embodiment, however, does not intend to prevent the disposition of the light receiving element dedicated to the light measurement. It is also possible to first roughly determine the exposure based on a light measuring signal from the light receiving element dedicated to the light measurement so as to thereafter decide an appropriate exposure according to the present embodiment.

In addition, according to the present embodiment, the light receiving area of the solid-state imaging device is subdivided into a plurality of areas so as to insulate these areas with each other such that the signal electric charge accumulated by the pre-shooting operation is discharged for each subdivided area. Consequently, the amount of the incident light can be respectively attained for these areas (multi-light measurement). As a result, the exposure can be appropriately controlled for any subdivided area.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
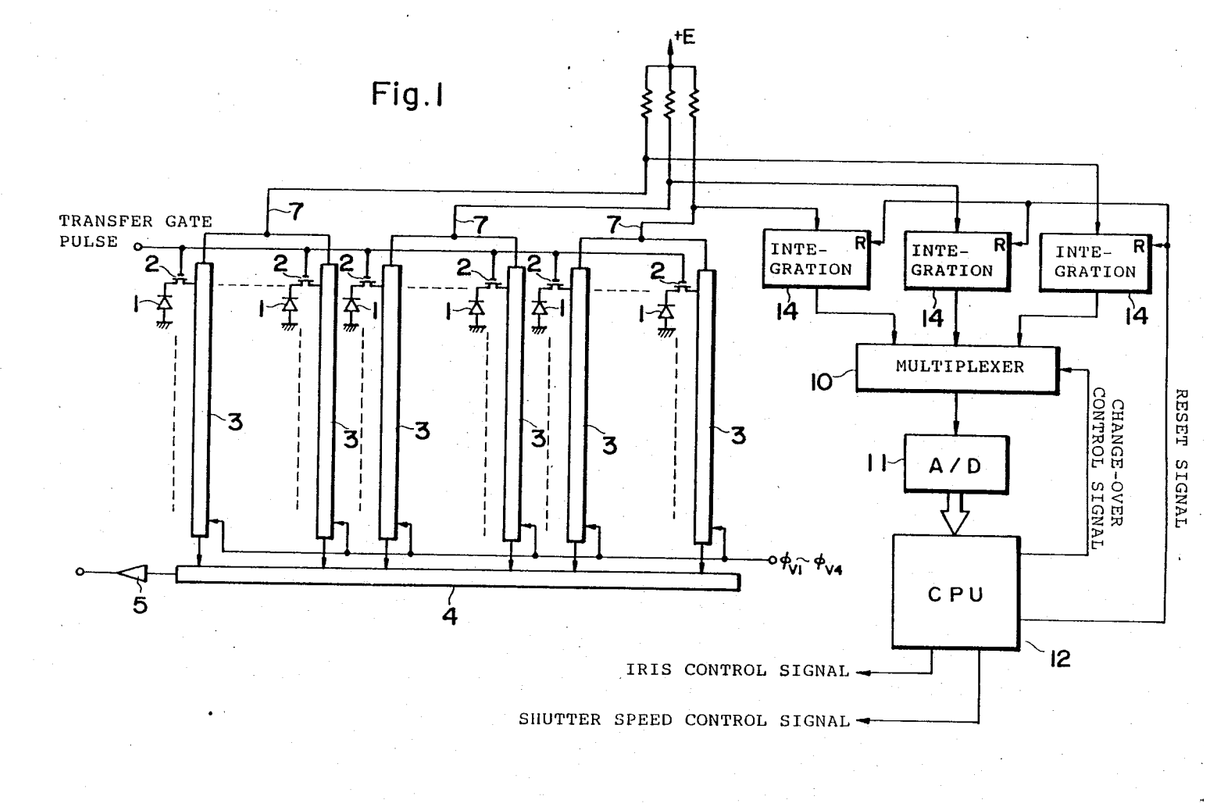
FIG. 1 is a circuit diagram schematically showing an embodiment of the solid-state electronic imaging device according to the present invention.

FIG. 1 shows the solid-state electronic imaging device according to an embodiment of the present invention. The solid-state electronic imaging device includes a plurality of photodiodes (photoelectric converter elements) 1 arranged along the vertical and horizontal directions, vertical CCDs (vertical transfer sections) 3 respectively arranged adjacent to the respective vertical columns of the photodiodes 1, transfer gates 2 disposed between the photodiodes 1 and the vertical CCDs 3 for transferring signal electric charge accumulated in the photodiodes 1 to the vertical CCDs 3 when a transfer pulse is applied thereto, a horizontal CCD (horizontal transfer section) 4 connected to an end (output terminal) of each vertical CCD 3, and an output section (electric charge amplify circuit) 5 connected to the output side of the horizontal CCD 4. This configuration is a solid-state electronic imaging device of a so-called inter-line transfer system.

All transfer gates 2 are supplied via the gate signal lines with a transfer gate pulse at the same time so as to enable the transfer gates 2. Electrodes (not shown) of each vertical CCD 3 are supplied with transfer pulses $\phi_{v1}$ to $\phi_{v4}$ or reverse transfer pulses $\phi_{v4}$ to $\phi_{v1}$. When the transfer pulses $\phi_{v1}$ to $\phi_{v4}$ are supplied, the signal charge is sequentially transferred through the vertical CCDs 3 in the direction toward the horizontal CCD 4, which is called a forward transfer. When the reverse transfer pulses $\phi_{v4}$ to $\phi_{v1}$ are supplied, the signal charge is sequentially transferred through the vertical CCDs 3 in the direction opposite to the direction above so as to be discharged, which is called a reverse transfer.

The plurality of vertical CCDs 3 are classified into three groups depending on the locations where the CCDs 3 are arranged in this embodiment. The other ends (reverse transfer charge discharge exit) of the vertical CCDs 3 belonging to a group are commonly connected to a charge discharge line 7. In consequence, according to this embodiment, the light measurement can be achieved for each of the three areas established by subdividing the light receiving area in the horizontal direction. The three discharge lines 7 are respectively connected to integration circuits 14 of which the output sides are connected to a multiplexer 10. An integration signal selected by the multiplexer 10 is converted into a digital signal by an A/D converter circuit 11 and supplied to a CPU 12. The CPU 12 outputs signals to sequentially change over the integration signals supplied to the multiplexer 10 and determines the amount of exposure based on the light measurement signal (integration signal) thus received, thereby outputting an iris control signal and/or a shutter speed control signal. In addition, the CPU 12 effects a reset processing of the integration circuit 14. The electric charge discharge lines 7 and the integration circuits 14 constitute a light measuring circuit. Depending on the circumstances, the multiplexer 10, the A/D converter circuit 11, and the CPU 12 may be included in the light measuring circuit.

Figure 2:
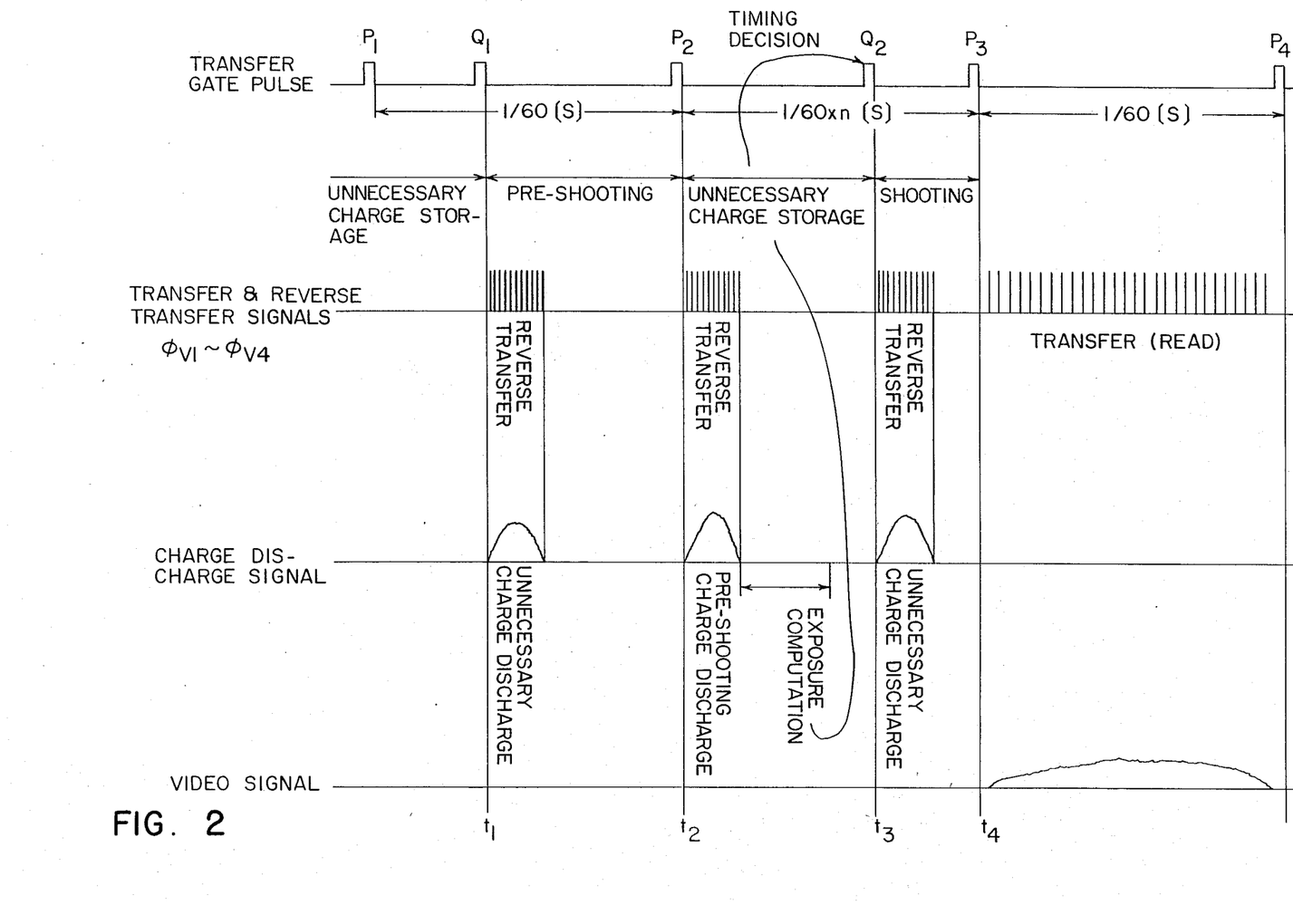
FIG. 2 is a timing chart showing an example of the operation of the circuit of FIG. 1.

FIG. 2 is a timing chart showing an example of the operations in the light measurement, the exposure control, and the shooting operation effected by the solid-state electronic imaging device of FIG. 1. This timing chart shows the operations suitable for a so-called electronic still camera in which a video signal associated with an image shot by the camera is recorded on a rotating video floppy disk. The video floppy disk undergoes a rotation control so as to be rotated at a rate of one turn per 1/60 second. Since the rotary phase of the video floppy disk is required to be synchronized with the timing of a shooting operation, transfer gate pulses (field shift pulses called synchronized transfer gate pulses) $P_1$, $P_2$, $P_3$, and $P_4$ are supplied at an interval of 1/60 second. The interval between the pulses $P_2$ and $P_3$ is set to $1/60 \times n$ (s), where n is a positive integer. In a case of $n \geq 2$, $(n-1)$ transfer gate pulses are naturally supplied at an interval of 1/60 second between the pulses $P_2$ and $P_3$.

For a light measurement, a pre-shooting operation is performed. In order to effect the pre-shooting operation, a transfer gate pulse $Q_1$ is supplied at a timing (at a point of time $t_1$ between the pulses $P_1$ and $P_2$) between the synchronized transfer gate pulses. It is favorable to fixedly determine a period of time between the pulse $Q_1$ and the subsequent synchronized transfer gate pulse $P_2$. The output time $t_1$ of the pulse $Q_1$ may be varied depending on an output from a light receiving element for the light measurement. However, this means that the shutter speed employed in the pre-shooting operation is variable and there is required processing in which the amount of light represented by the light measurement signal supplied to the CPU 12 is converted into the amount of light per a unit of time.

When the transfer gate pulse $Q_1$ is supplied, the unnecessary electric charge accumulated in the photodiodes 1 prior to the time $t_1$ is respectively transferred to the vertical CCDs 3. The unnecessary electric charge is reversely transferred when the reverse transfer signals $\phi_{v4}$ to $\phi_{v1}$ are applied to the vertical CCDs 3, through the vertical CCDs 3 so as to be discharged via the electric charge discharge lines 7 as the unnecessary electric charge.

As described above, the period of time from outputting the pulse $Q_1$ to delivering the next synchronized transfer pulse $P_2$ (from $t_1$ to $t_2$) is fixed such that the pre-shooting operation is accomplished during this period of time, thereby conducting the light measurement during the pre-shooting operation. It may also be possible to achieve a plurality of pre-shooting operations.

As a result of the pre-shooting operation, the electric charge accumulated in the photodiodes 1 is transferred to the vertical CCDs 3 in response to the synchronized transfer gate pulse $P_2$. Also in this situation, the reverse transfer pulses $\phi_{v4}$ to $\phi_{v1}$ are supplied to the CCDs 3 so that the signal electric charge thus accumulated is discharged via the electric charge discharge lines 7, respectively. The integration circuits 14 are reset when the reverse transfer is initiated (namely, at the time $t_2$ when the pulse $P_2$ is delivered). The signal electric charge fed to each electric charge discharge line 7 is integrated in the corresponding integration circuit 14.

At a point of time when the signal electric charge is completely discharged, the integrated value outputted from the respective integration circuit 14 is sequentially delivered to the multiplexer 10 so as to be converted by the A/D converter circuit 11 into a digital signal, which is then delivered to the CPU 12.

Based on the three integrated values of the amount of light thus received, the CPU 12 accomplishes the exposure control. The amount of light exposure onto the solid-state electronic imaging device is controlled by use of the iris value and the shutter speed. The following methods are adopted to control the iris value and the shutter speed based on the amount of incident light thus measured. In the first method, a table (program line chart) in which the optimal iris values and the optimal shutter speed values are predetermined for the respective intensity of illumination is stored in a RAM or a ROM of the CPU 12 beforehand, so that the optimal iris value and the optimal shutter speed are read from this table by using the measured amount of incident light as a key for the read operation, thereby conducting the exposure control operation. In the second method, there is incorporated in the program a computation formula for attaining the optimal iris value and the optimal shutter speed such that the measured amount of light is assigned to the formula so as to determine the optimal iris value and the optimal shutter speed. In this case, the optimal iris value is, in general, first attained by use of the measured amount of light and then the shutter speed is computed by use of the attained iris value. It may also be possible to fix either the iris value or the shutter speed so that the other parameter or both parameters are adjusted to the optimal values. The adjustment of the iris value need only be achieved according to the known iris control. In a case of the electronic shutter, the shutter speed is controlled by adjusting the output timing of the transfer gate pulse $Q_2$, which will be described later.

In this embodiment, the light receiving area is subdivided into three partitions along the horizontal direction so as to separately measure the amount of incident light in each location. Consequently, when one of the three locations is specified by use of input means, the overall exposure amount can be controlled depending on the amount of the light thus measured in the location, which enables the user of the camera to shoot an object scene with an optimal exposure value for a desired location. It is natural that the exposure amount can be determined by use of the total or the average of the values of incident lights measured in the three locations.

Thereafter, when the transfer gate pulse $Q_2$ is delivered at a predetermined point of time $t_3$ (in a case of a fixed shutter speed) or at a point of time $t_3$ corresponding to the determined shutter speed, the electric charge accumulated beginning from the point of time of the pulse $P_2$ in the photodiodes 1 is discharged as unnecessary electric charge. The period of time from the pulse $Q_2$ to the next synchronized transfer gate pulse $P_3$ (the time from $t_3$ to $t_4$) is used for an actual shooting operation. When an exposure is effected in this period of time, the signal electric charge accumulated in the photodiodes 1 is transferred to the vertical CCDs 3 when the synchronized gate pulse $P_3$ is supplied to the transfer gates 2. Since the transfer signals $\phi_{v1}$ to $\phi_{v4}$ are applied to the CCDs 3, the electric charge transferred into the vertical CCDs 3 is sequentially delivered to the horizontal CCD 4 and the charge is fed therefrom to the output section 5, which then outputs a video signal therefrom. A field of the video signals is read out at a period of 1/60 second and is then subjected to processing operations such as the frequency modulation as described above so as to be recorded on a video floppy disk. Although not shown in the drawings, it is natural that a horizontal transfer pulse is supplied to the horizontal CCD 4.

Figure 3:
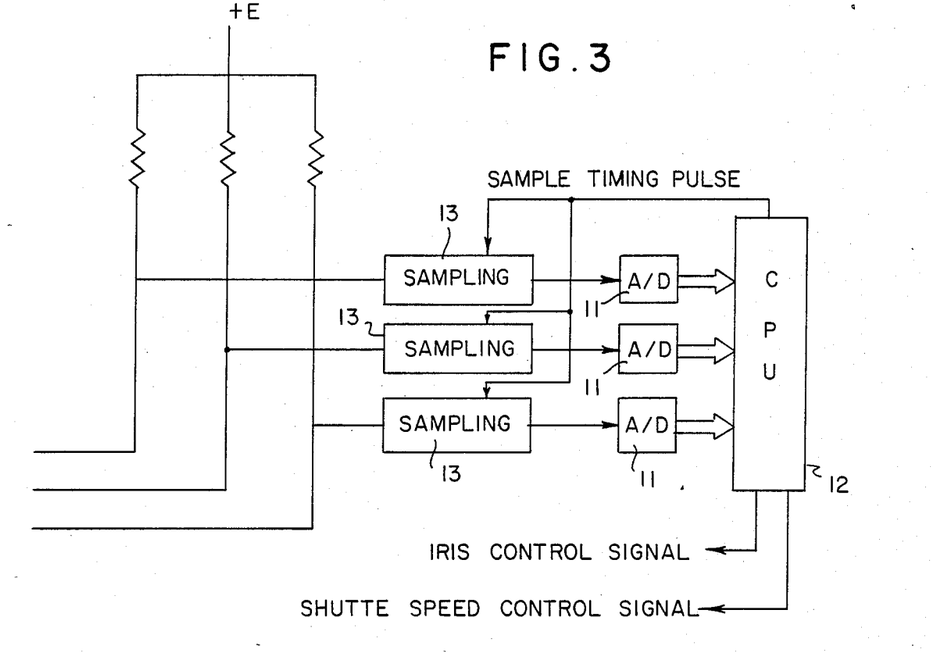
FIG. 3 is a schematic circuit diagram showing an alternative embodiment according to the present invention.
Figure 4:
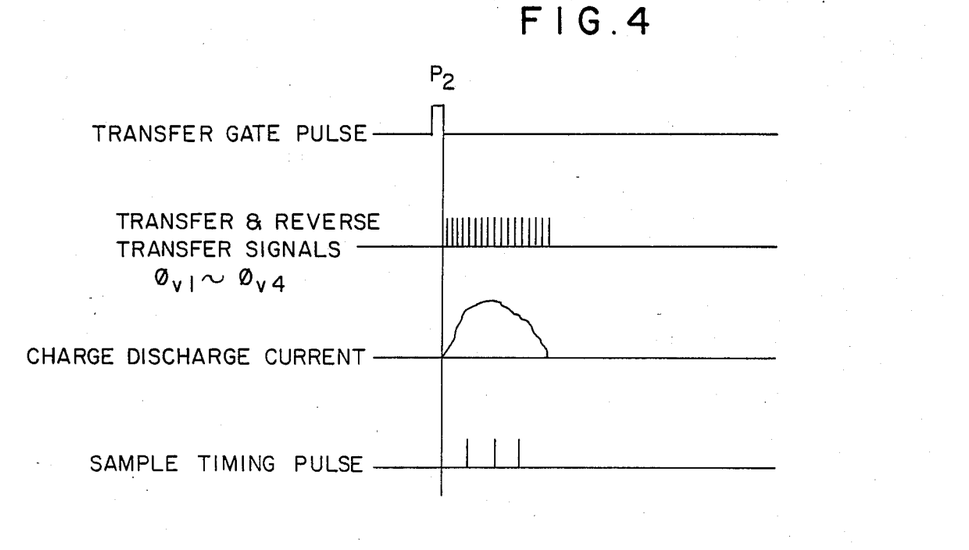
FIG. 4 is a timing chart showing an example of the operation of the circuit of FIG. 3.

FIGS. 3 and 4 show an alternative embodiment according to the present invention. In order to subdivide the light measuring location into partitions along the vertical direction, there is disposed a sampling circuit 13 for each electric charge discharge line 7 as shown in FIG. 3. As can be seen from the timing chart of FIG. 4, while the signal charge is being fed to the discharge lines 7 during the pre-shooting operation, the electric charge is sampled at an appropriate sampling timing so as to be delivered via the A/D converter circuits 11 into the CPU 12. The sampling count or the number of sampling operations is determined by the number of partitions disposed along the vertical direction. It is desirable to integrate the signal electric charge in a predetermined period of time immediately before the sampling operation (for example, in the sampling interval) and to sample the integrated values for the further processing. In this situation, the integration circuit is to be cleared for each sampling operation.

In the embodiment above, although the solid-state electronic imaging device is of the inter-line transfer type, the present invention is applicable to the solid-state electronic imaging devices of any type such as a zigzag transfer system in which the shutter speed (exposure time) is controlled by use of the reverse transfer. In addition, the transfer pulses are not limited to the four phases, namely, the present invention is applicable to, for example, the imaging elements associated with 2-phase and 3-phase transfer pulses.

In addition, although it has not been clearly described above whether the embodiment employs the interlace scanning or the noninterlace scanning, the present invention can be applied to both scanning systems. Furthermore, the present invention is applicable regardless of whether the operation is effected in a monochrome or a color system.

Next, a description will be given for an alternative embodiment of the present invention.

Figure 5:
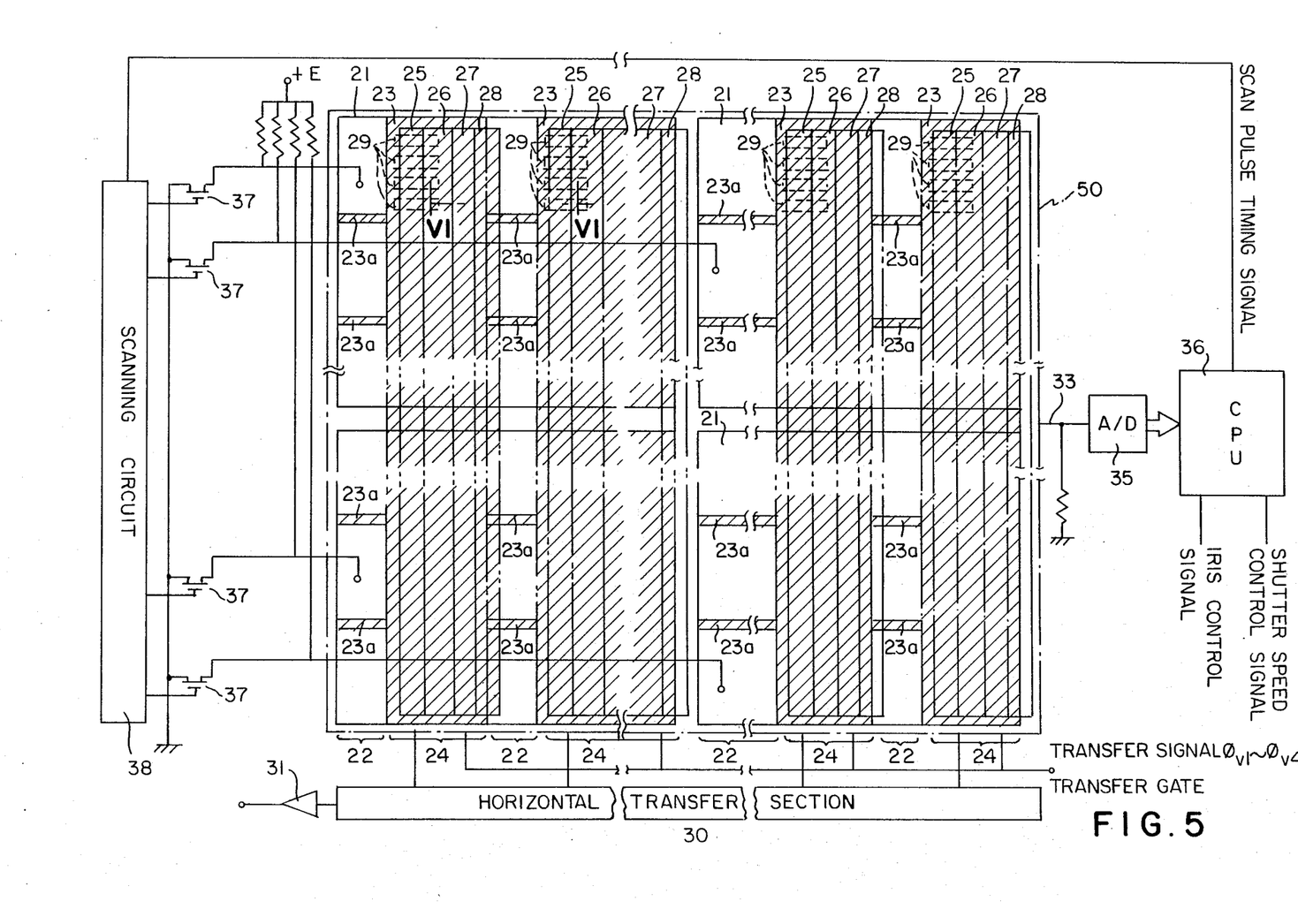
FIG. 5 is a circuit diagram showing an alternative embodiment of the solid-state electronic imaging device according to the present invention.
Figure 6:
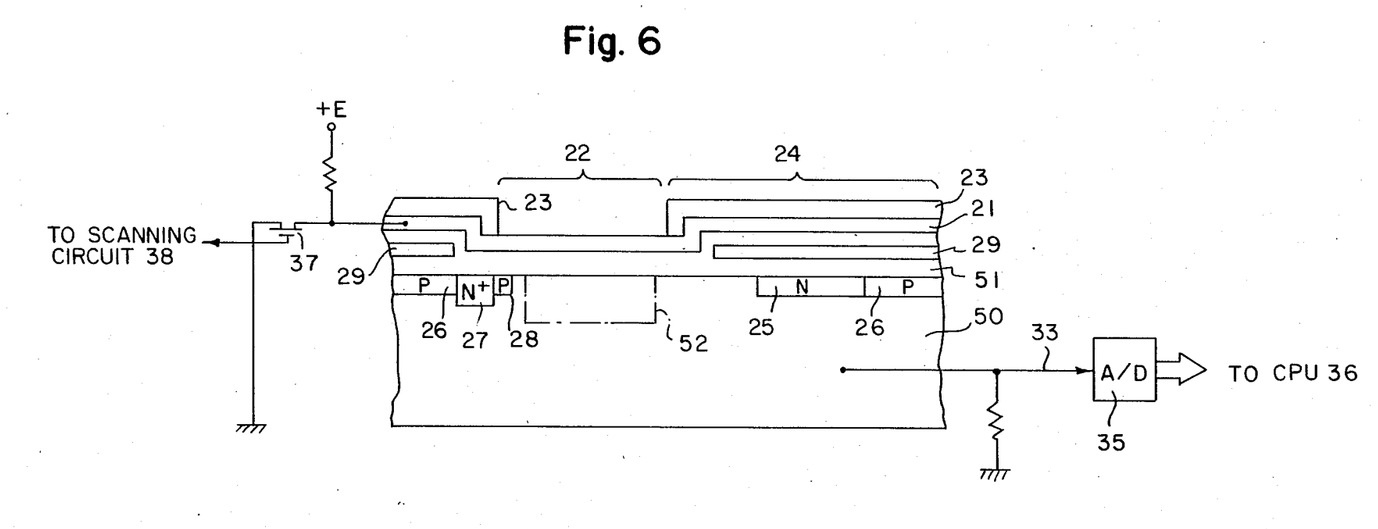
FIG. 6 is an enlarged cross-sectional view of the circuit of FIG. 5 along line VI—VI.

FIG. 5 shows another embodiment in which the solid-state electronic imaging device according to the present invention is applied to an electronic still camera. FIG. 6 shows an enlarged cross-sectional view of FIG. 5 along line VI—VI.

The solid-state electronic imaging device includes a plurality of light receiving columns 22 each including photoelectric converter elements of a MOS capacitor type arranged in a column for storing signal electric charge corresponding to an amount of incident light, a plurality of vertical transfer sections 24 respectively disposed adjacent to the light receiving columns 22, a horizontal transfer section 30 connected to an output terminal of each of the vertical transfer sections 24, and an electric charge amplify circuit 31 connected to the output side of the vertical transfer section 30.

A substrate 50 in which components such as the light receiving columns 22 and the vertical transfer sections 24 are disposed is connected to an electric charge discharge line 33, which is in turn linked with an A/D converter circuit 35 having an output side connected to a CPU 36. The CPU 36 delivers a scan pulse timing signal to control the electric charge discharge operation of the solid-state electronic imaging device. In this operation, the CPU 36 receives a signal sent from the A/D converter circuit 35 so as to output a shutter speed control signal and an iris control signal based on the received signal. The light receiving columns 22 possess transparent electrodes 21, which will be described later, are connected to a scanning circuit 38 via switching elements 37 and supplied with a predetermined voltage E. The scanning circuit 38 receives as an input thereto a scan pulse timing signal from the CPU 36 so as to produce a scan pulse corresponding thereto.

Referring now to FIG. 6, the photoelectric conversion elements of the light receiving columns 22 each include an MOS capacitor structure that is configured with an insulation layer 51 and the transparent electrodes 21 are formed on the substrate 50. The vertical transfer sections 24 are provided with transfer electrodes 29 for transferring signal electric charge in the insulation layer 51, namely, the signal electric charge is transferred by supplying 4-phase transfer signals $\phi_{v1}$ to $\phi_{v4}$ to the electrodes 29. In addition, these electrodes 29 also function as a gate electrode, that is, when they are supplied with the transfer gate pulse, the electrodes 29 function to transfer the signal electric charge accumulated in the light receiving columns 22 to the vertical transfer sections 24.

On the upper surface of the transfer electrodes 29, a light interrupting layer 23 is disposed, which is indicated in FIG. 5 by show portions. Also in the light receiving columns 22, the regions are separated for each pixel (each photoelectric converter element) by means of a light interrupting layer 23a. Beneath the light interrupting layer 23a (the boundary surface between the insulation layer 51 and the substrate 50), there is disposed a channel stopper, although not shown, so as to prevent signal electric charge from the pixels adjacent to each other along the vertical direction from being mixed with each other.

Returning now to FIG. 6, at the boundary surface between the substrate 50 and the insulation layer 51, a channel stopper 26 to prevent the blooming in which excessive electric charge overflows into the adjacent vertical transfer section 24 and an overflow drain 27 are disposed. In addition, there is formed an overflow gate 28 to control the overflow drain 27.

In the vertical transfer section 24, there is formed an N layer 25 for effecting the electric charge transfer through the inside of the substrate 50, which is not on the boundary surface between the substrate 50 and the insulation layer 51. A device of this structure is called a buried channel device (BCCD).

Referring again to FIG. 5, in this solid-state electronic imaging device, the transparent electrode 21 is partitioned into four regions on the overall zone of the substrate 50 so as to be insulated from each other. For each electrode region, a clear (discharge) operation of the signal electric charge can be separately controlled by means of the scanning circuit 38 via the switching elements 37.

Next, a description will be given of a transfer operation for transferring the signal electric charge accumulated by the light radiated onto the light receiving columns 22 into the vertical transfer sections 24 and an operation for discharging the signal electric charge to the side of the substrate 50.

When a predetermined voltage E is applied to the transparent electrode 21, a well 52 of an electric potential appears in the upper surface of the substrate 50 as indicated with dot-and-dash lines in FIG. 6. When the light is radiated onto the light receiving section 22, electric charge is accumulated in the potential well 52 in accordance with the amount of the irradiated light. In order to transfer the accumulated signal charge to the transfer section 24, a transfer gate pulse is first supplied to the transfer electrode 29. This causes a high-potential well (not shown) to appear beneath the vertical transfer section 24. The well has a potential higher than the potential of the high potential well 52 existing beneath the light receiving section 22. As a result, the signal charge accumulated in the potential well 52 beneath the light receiving section 22 is transferred to the potential well appearing beneath the vertical transfer section 24. In response to the transfer signals $\phi_{v1}$ to $\phi_{v4}$, the signal charge transferred to the vertical transfer section 24 is further delivered to the horizontal transfer section 30 through the vertical transfer section 24.

The signal electric charge accumulated in the potential well 52 formed in the MOS capacitor is discharged as follows. First, the switching element 37 is turned on so as to lower the voltage applied to the transparent electrode 21. This causes the potential well 52 to disappear from the substrate 50. The signal electric charge accumulated in the potential well 52 is then injected into the substrate 50 so as to undergo recombination with majority carriers therein, which generates an electric current flow, thereby discharging the electric charge through the electric charge clear or discharge line 33. Since the switching 37 is disposed for each of the four subdivided regions, the charge clear or discharge operation can be individually effected for the respective region.

Figure 7:
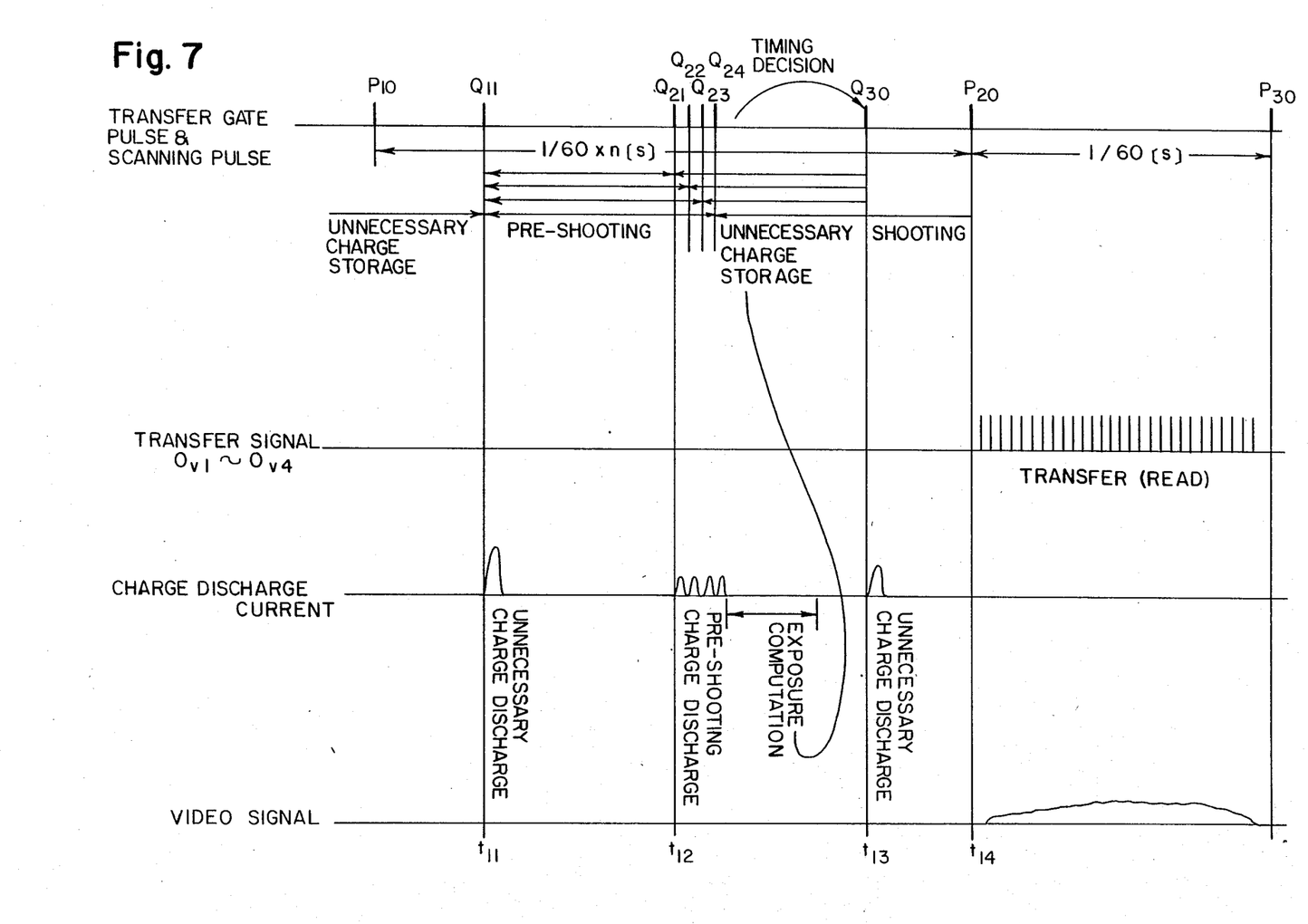
FIG. 7 is a timing chart showing an example of the operation of the embodiment of FIG. 5.

FIG. 7 is a timing chart showing an example of the light measurement, the exposure control, and the shooting operation effected by use of the solid-state electronic imaging device of FIG. 5. Referring to FIG. 7, a description will be given for a shooting operation in an electronic still camera integrated with the solid-state electronic imaging device.

The video floppy disk of the electronic still camera is controlled so as to rotate at a rotary speed of one turn per 1/60 second. Since the rotary phase of the video floppy disk and the timing of the shooting operation are required to be synchronized with each other, the transfer electrode 29 is supplied at an interval of 1/60 second with transfer gate pulses (field shift pulses called synchronized transfer gate pulses) $P_{10}$, $P_{20}$, and $P_{30}$. The interval between the pulses $P_{10}$ and $P_{20}$ is set to $1/60 \times n$ (s), where n is a positive integer. In a case of $n \geq 2$, it is natural that $(n-1)$ transfer gate pulses are delivered between the pulses $P_{10}$ and $P_{20}$ at an interval of 1/60 second.

A pre-shooting operation is effected for the light measurement. In order to achieve the pre-shooting operation, the scanning circuit 38 supplies all switching elements 37 with a scan pulse $Q_{11}$ at a timing (at a time $t_{11}$ between the pulses $P_{10}$ and $P_{20}$) between the synchronized transfer gate pulses. It is desirable to fixedly determine the periods of time between the pulse $Q_{11}$ and the four scan pulses $Q_{21}$, $Q_{22}$, $Q_{23}$, and $Q_{24}$, respectively. Although the output time $t_{11}$ of the pulse $Q_{11}$ may be varied depending on an output from the light receiving element for the light measurement, this means that the shutter speed employed in the pre-shooting operation is variable, which requires the amount of light represented by the light measurement signal supplied to the CPU 36 to be converted into an amount of light per a unit of time.

When the scan pulse $Q_{11}$ is supplied, the unnecessary electric charge accumulated in the potential well 52 prior to the time $t_{11}$ is discharged to the side of the substrate 50.

The periods of time between when the pulse $Q_{11}$ is outputted when the scan pulses $Q_{21}$, $Q_{22}$, $Q_{23}$ and $Q_{24}$ are delivered (for example, the time between $t_{11}$ and $t_{12}$) are respectively fixed, and the pre-shooting operation is achieved in these periods of time so as to effect the light measurement in the pre-shooting operation.

The electric charge accumulated in the potential well 52 as a result of the pre-shooting operation is, when the four scan pulses $Q_{21}$, $Q_{22}$, $Q_{23}$, and $Q_{24}$ are sequentially supplied to the respective switching elements 37, discharged from the respective partitioned areas via the corresponding electric charge clear line 33. The signal electric charge thus discharged onto the respective electric charge clear line 33 is sequentially converted into a digital signal by the A/D converter circuit 35 so as to be supplied to the CPU 36.

The CPU 36 conducts the exposure control based on the amount of the signal electric charge received in association with each partitioned area. The exposure amount of the solid-state electronic imaging device is controlled according to the iris value and the shutter speed. For the control of the iris value and the shutter speed based on the amount of the incident light thus measured, there are employed two methods as described above.

The adjustment of the iris value, in any cases, only needs to be accomplished according to the known iris control. In a case of an electronic shutter, the shutter speed is controlled by adjusting the output timing of the scan pulse $Q_{30}$, which will be described later.

In this embodiment, since the light receiving area is subdivided into four partitions and the amount of incident light can be independently measured in each location, it is possible to control the overall exposure value based on the amount of light measured in any one of the four locations specified from input means. Thereby, the operator of the camera is enabled to shoot an object scene with an appropriate exposure amount for a desired location. It is natural that the exposure amount can be determined according to the total or the average of the amount of lights measured in the four locations.

Thereafter, at a predetermined time $t_{13}$ or at a time $t_{13}$ corresponding to the shutter speed thus determined, the scan pulse $Q_{30}$ is outputted such that all switching elements 37 are turned on, which causes the electric charge accumulated in the potential well 52 from the points of time associated with the four pulses $Q_{21}$, $Q_{22}$, $Q_{23}$, and $Q_{24}$ to be discharged as the unnecessary electric charge, respectively. The period of time from the pulse $Q_{30}$ to the next synchronized transfer gate pulse $P_{20}$ (the time from $t_{13}$ to $t_{14}$) is assigned as the time zone for the actual shooting operation. When an exposure is effected in this period of time, the signal electric charge accumulated in the potential well 52 is delivered to the vertical transfer sections 24 in response to an operation in which the synchronized transfer gate pulse $P_{20}$ is supplied to the transfer electrodes 29. Since the transfer signals $\phi_{v1}$ to $\phi_{v4}$ are supplied to the vertical transfer sections 24, the electric charge supplied to the vertical transfer sections 24 are sequentially transferred to the horizontal transfer section 30, which delivers the electric charge as a video signal from the output section 31.

A field of video signals is read out in a period of time of 1/60 second so as to undergo processing operations such as a frequency modulation as described above, thereby recording the video signals on a video floppy disk. Although not shown, it is natural that the horizontal transfer section 30 is supplied with a horizontal transfer pulse.

Although the solid-state electronic imaging device in this embodiment is of an inter-line transfer system, the present invention is applicable to any type of solid-state electronic imaging devices using a light receiving section of the MOS capacitor type e.g. of the zigzag transfer (ZT) type.

In addition, although it has not been clarified whether the interlace scanning or the noninterlace scanning is adopted in the embodiment above, the present invention is applicable to both types of imaging devices. Moreover, the present invention can be applied regardless of whether a monochrome or a color system is employed in the imaging device.

We claim:

1. A solid-state electronic imaging device comprising:
   a plurality of photoelectric converter elements disposed in vertical and horizontal directions for accumulating therein signal electric charge corresponding to an amount of incident light;
   vertical transfer sections arranged in a vertical direction adjacent to said photoelectric converter elements arranged in the vertical direction, said vertical transfer sections transferring signal electric charge in a direction toward output terminals in response to a transfer signal and reversely transferring signal electric charge in a direction toward discharge exit terminals disposed at a position opposite to the output terminals in response to a reverse transfer signal;
   transfer gates for transferring the signal electric charge accumulated in said photoelectric converter elements to said vertical transfer sections adjacent thereto in response to a gate signal;
   a measuring circuit connected to the discharge exit terminals of said vertical transfer sections for measuring an amount of the incident light corresponding to an amount of the signal electric charge reversely transferred; and
   a horizontal transfer section connected to the output terminals of said vertical transfer sections for sequentially transferring in a horizontal direction the signal electric charge forwardly transferred, thereby outputting a video signal.

2. A solid-state electronic imaging device according to claim 1, wherein said measuring circuit is connected to the discharge exit terminals of said vertical transfer sections.

3. A solid-state electronic imaging device according to claim 1, wherein said measuring circuit comprises a plurality of measuring circuit sections, each of said measuring circuit sections being connected to the discharge exit of one of said vertical transfer sections or to the discharge exits of a group of a predetermined number of said vertical transfer sections.

4. A solid-state electronic imaging device according to claim 1, wherein said measuring circuit comprises an integration circuit for integrating the signal electric charge in a predetermined range discharged through the reverse transfer.

5. A solid-state electronic imaging device according to claim 1, wherein said measuring circuit comprises a sampling circuit for sampling at a predetermined timing the signal electric charge discharged through the reverse transfer.

6. A solid-state electronic imaging device comprising:
   a plurality of photoelectric converter elements of an MOS capacitor type arranged in a two-dimensional array on a light receiving area of a substrate;
   a plurality of vertical transfer sections for transferring in a vertical direction signal electric charge obtained through a photoelectric conversion from said photoelectric converter elements;
   a horizontal transfer section for transferring in a horizontal direction signal electric charge inputted from said vertical transfer sections;
   wherein the signal electric charge is discharged from said photoelectric converter elements into the substrate when a clear signal is applied thereto and the light receiving area of said substrate is subdivided into a plurality of areas which are insulated from each other; and
   a measuring circuit for measuring an amount of incident light corresponding to an amount of the signal electric charge discharged from each of said subdivided areas.

* * * * *